(12) United States Patent
Sun et al.

(10) Patent No.: US 8,670,298 B2
(45) Date of Patent: Mar. 11, 2014

(54) METHOD, SYSTEM AND APPARATUS FOR SIGNAL GENERATION AND MESSAGE TRANSMISSION IN BROADBAND WIRELESS COMMUNICATIONS

(75) Inventors: Shaohui Sun, Beijing (CN); Yang Yu, Beijing (CN); Yingmin Wang, Beijing (CN); Yongbin Xie, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 555 days.

(21) Appl. No.: 12/744,550

(22) PCT Filed: Nov. 26, 2008

(86) PCT No.: PCT/CN2008/001932
§ 371 (c)(1),
(2), (4) Date: Jun. 11, 2010

(87) PCT Pub. No.: WO2009/070983
PCT Pub. Date: Jun. 11, 2009

(65) Prior Publication Data
US 2010/0254253 A1 Oct. 7, 2010

(30) Foreign Application Priority Data
Nov. 26, 2007 (CN) .......................... 2007 1 0178100

(51) Int. Cl.
*H04J 11/00* (2006.01)
(52) U.S. Cl.
USPC ......................................................... 370/210
(58) Field of Classification Search
None
See application file for complete search history.

(56) References Cited

U.S. PATENT DOCUMENTS

| | | | |
|---|---|---|---|
| 7,808,886 B2 * | 10/2010 | McCoy | 370/210 |
| 2003/0067961 A1 | 4/2003 | Hudson et al. | |
| 2006/0002451 A1 | 1/2006 | Fukuta et al. | |
| 2006/0184862 A1 * | 8/2006 | Kim et al. | 714/784 |
| 2011/0080936 A1 * | 4/2011 | Dent | 375/143 |

FOREIGN PATENT DOCUMENTS

| | | |
|---|---|---|
| CN | 1367615 | 9/2002 |
| CN | 15 714 14 | 1/2005 |
| CN | 1571414 | 1/2005 |
| CN | 101232484 | 7/2008 |
| EP | 2 120 413 | 11/2009 |
| WO | 99/05797 | 2/1999 |
| WO | 2005/088853 | 9/2005 |
| WO | 2009/097805 | 8/2009 |

* cited by examiner

*Primary Examiner* — Rhonda Murphy
(74) *Attorney, Agent, or Firm* — Fay Kaplun & Marcin, LLP

(57) ABSTRACT

Method for signal generation in broadband wireless communications, comprises: A. modulating, segmenting and serial-parallel converting the signal data to be transmitted, then computing DFT of the serial-parallel converted data so as to transfer them to frequency domain; B. performing block unit modulating processing and block repeat modulating processing on the frequency domain data, then mapping the block units to assigned time-frequency positions; C. computing IFFT of the mapped block units, then adding them to the cycle prefix, thus the random sequences in time domain are generated. Apparatus for signal generation, Method and system for message transmission in broadband wireless communications are also disclosed. The problem of resource allocation and scheduling, and problem of interference coordination and control are solved, the throughput and performance of communication system are greatly improved.

8 Claims, 8 Drawing Sheets

--Prior Art--

METHOD, SYSTEM AND APPARATUS FOR SIGNAL GENERATION AND MESSAGE TRANSMISSION IN BROADBAND WIRELESS COMMUNICATIONS

CROSS REFERENCE TO RELATED APPLICATIONS

This application is a national phase filing under 35 U.S.C. §371 of International application number PCT/CN2008/ 001932, filed Nov. 26, 2008, which claims priority from Chinese Application No. 200710178100.3, filed Nov. 26, 2007. The entire contents of the prior applications are incorporated herein by reference in their entirety.

FIELD OF THE INVENTION

The present invention relates to the field of transmitting information and particularly to a method and device for generating a signal and a method and device for transmitting information in broadband wireless communications.

BACKGROUND OF THE INVENTION

Along with rapid development of a mobile communication technology, broadband wireless communications becomes a predominant development trend of future mobile communications. The International Telecommunication Union (ITU) has further provided a more powerful and advanced mobile communication system, i.e., IMT-Advanced, based upon the International Mobile Telecommunications-2000 (IMT-2000). The IMT-Advanced system with the maximum wireless communication bandwidth up to 100 MHz supports low-level to high-level mobility applications and data rates in a very wide range. In the IMT-Advanced system, the maximum transmission rate may be up to 1 Gbps to satisfy demands of a user and a service in various user scenarios, for example, the user may enjoy numerous wireless mobile services such as high-speed data downloading, Internet shopping, mobile video chatting, and a mobile phone television, thereby enriching greatly the life of the user. The IMT-Advanced system is further capable of offering a high-quality multimedia application with a significantly improved Quality of Service (QoS).

In an existing 3GPP Long Term Evolution (LTE) system, uplink data and control signaling of a broadband wireless communication system is transmitted in an approach of a signal carrier for the purpose of reducing a Peak-Average Power Ratio (PAPR) of the uplink signal and hence improving coverage of the uplink signal. At present in the LTE system, Discrete Fourier Transform-Spread Orthogonal Frequency Division Multiplexing (DFT-S OFDM), similar to the Orthogonal Frequency Division Multiple Access (OFDMA) adopted in an approach of generating a signal, is adopted in an approach of an uplink signal carrier. Specifically, an approach of generating a signal over the DFT-S OFDM is as illustrated in FIG. 1.

At a transmitter, firstly signal data for transmission is modulated and a data stream for transmission is segmented, then the segmented data stream is serial-parallel (S/P) converted, and next the serial-parallel converted data is transformed in a Discrete Fourier Transform (DFT) process to the frequency domain where it is further spread and subject to an Inverse Fast Fourier Transform (IFFT) process and finally appended with Cyclic Prefixes (CPs) to generate a random sequence in the time domain. A serial-parallel converted data block is assumed as $s=\{s_1, s_2, \ldots, s_M\}$, and the random sequence generated from the DFT and IFFT processes is assumed as $s=\{s'_1, s'_2, \ldots, s'_N\}$. Correspondingly at a receiver, a high-rate data stream is parallel-serial converted over the DFT-S OFDM so that duration of a data symbol over each sub-carrier is relatively increased to thereby reduce effectively both inter-symbol interference due to temporal diffusion of a wireless channel and complexity of balance in the receiver. Balance in the frequency domain may facilitate processing of the signal at the receiver.

In FIG. 1, in order to ensure a process of balancing a signal in the frequency domain and reduce complexity of implementing a system, the signal is processed over the DFT-S OFDM like a downlink Orthogonal Frequency Division Multiplexing (OFDM) symbol, so that users may be distinguished from one another over the Frequency Division Multiple Access (FDMA) where different sub-bands are occupied to thereby enable a multiple access of the users. Unfortunately, the DFT-S OFDM multiple access still has the following drawbacks.

In an application of the uplink DFT-S OFDM multiple access to a cellular mobile communication system, networking at the same frequency may result in significant inter-cell interference because users in different cells with reception and transmission of data over the same sub-carrier may possibly interfere reception and transmission of data of a user terminal in an adjacent cell. Especially at an edge of a cell, a user terminal at a relatively short distance from another cell is subject to a relatively strong signal arriving from the other cell, and during reception and transmission of data at the user terminal, serious mutual interference may arise between signals of the adjacent cells, so that communication performance of the user terminal at the edge of the cell may be degraded sharply.

In order to avoid interference of a signal from an adjacent cell in the case of networking at the same frequency, a relevant modified solution has been proposed, for example, interference of a signal in the case of networking at the same frequency may be reduced by combining the Code Division Multiplex Access (CDMA) and the OFDM in downlink OFDM modulation. At present, the multiplex access in which the CDMA and the OFDM are combined typically includes the Multi-Carrier CDMA (MC-CDMA), the Multi-Carrier-Direct Spreading-CDMA (MC-DS-CDMA) and the OFCDMA in which two-dimension spreading in the time and frequency domains and the OFDM are combined.

Particularly, an approach of generating a signal over the MC-CDMA is as illustrated in FIG. 2, the flow of which is as follows: firstly each of several data symbols in a data stream consisted of the symbols is spread, and then the spread data is mapped onto OFDM modulated sub-carriers over which the spread data symbols are output. The length of a spreading code is assumed as N, and then the spread data is mapped onto a number N of sub-carriers $f_1, f_2 \ldots f_N$. The MC-CDMA has advantages over the OFDM of utilizing frequency diversity and reducing interference between adjacent cells in the case of networking at the same frequency.

An approach of generating a signal over the MC-DS-CDMA is as illustrated in FIG. 3, the flow of which is as follows: firstly a data stream consisted of several data symbols is serial-parallel converted and the data is mapped onto various sub-carriers, then each symbol is spread over the corresponding sub-carrier, i.e., spread temporally, to achieve a gain of temporal diversity, and thereafter the spread data symbols are output. The length of a spreading code is assumed as N, and a number N of sub-carriers are $f_1, f_2 \ldots f_N$. The MC-DS-CDMA also has an advantage over the OFDM of reducing interference between adjacent cells in the case of networking at the same frequency.

Further to the foregoing two multiple access approaches in which the CDMA and the OFDM are combined, there is also the Orthogonal Frequency and Code Division Multiplexing (OFCDM) in which two-dimension spreading in the time and frequency domains and the OFDM are combined, where each data symbol is spread temporally by a factor of M and also spread by a factor N over a sub-carrier, as illustrated in FIG. 4, by a factor of 4 in the time domain and 2 in the frequency domain.

The above solutions of MC-CDMA, MC-DS-CDMA and OFCDM in which the CDMA and the OFDM are combined may also be applicable to an approach of generating an uplink DFT-S OFDM signal. These solutions may all achieve specific gains of diversity and an anti multiple access interference capacity, easily achieve networking of plural cells at the same frequency and reduce interference between the adjacent cells in the case of networking at the same frequency. Like the CDMA, however, the foregoing solutions are demanding for temporal and frequency synchronization of a signal, where the same time and frequency resources have to be occupied for data of the cells to detect signals of users of the cells, thus requiring coordination and scheduling of the resources between the cells. Moreover, detection for the users also necessitates information available to the UE about time and frequency resources and spreading codes occupied by other users. In the foregoing several solutions, neither allocation and scheduling of resources nor coordinated control of interference is sufficiently flexible and convenient; multiple access interference has to be eliminated at the receiver in a complicated process at a high cost; and channel fading and interference may also give rise to a sudden error of some symbols.

SUMMARY OF THE INVENTION

In view of this, a general object of embodiments of the invention is to provide a method and device for generating a signal and a method and device for transmitting information in broadband wireless communications, which can well address the issues of allocation and scheduling of resources and coordinated control of interference to thereby improve greatly a capacity and performance of a system.

In order to attain the foregoing object, technical solutions of embodiments of the invention are accomplished as follows.

An embodiment of the invention provides a method for generating a signal in broadband wireless communications, which includes:

A. modulating, segmenting and serial-parallel converting signal data for transmission, and transforming the serial-parallel converted data to frequency domain in a Discrete Fourier Transform (DFT) process;

B. block unit modulating and block repeat modulating a data symbol block transformed to the frequency domain, and mapping block units obtained after the block unit modulating and the block repeat modulating onto specified time and frequency locations; and C. transforming the block units mapped onto the time and frequency locations in an Inverse Fast Fourier Transform (IFFT) process, and appending Cyclic Prefixes, CPs, onto the transformed block units to generate a random sequence in time domain.

The block unit modulating and block repeat modulating the data symbol block transformed to the frequency domain in the operation B includes:

B11. modulating the data symbol block transformed to the frequency domain to generate a block unit; and B12. weighting and repeating the generated block unit, the block units obtained by the block unit modulating and the block repeat modulating are the block units obtained by the weighting and repeating.

Alternatively, the block unit modulating and block repeat modulating the data symbol block transformed to the frequency domain in the operation B includes:

B21. weighting and repeating the data symbol block transformed to the frequency domain; and B22. modulating data symbol blocks obtained by the weighting and repeating to generate block units, the block units obtained by the block unit modulating and the block repeat modulating are the block units generated in the operation B22.

In the foregoing solutions, the weighting and repeating is performed in the time domain; and different users are multiplexed along a power axis and distinguished by different block repeat weighting sequences.

Further, an embodiment of the invention provides a device for generating a signal in broadband wireless communications, which includes a data modulation module, a serial-parallel conversion module, a DFT module, an IFFT module, a cyclic prefix module, and a block unit modulation and block repeat modulation module which is arranged between the DFT module and the IFFT module and configured for block repeat modulation and block unit modulation.

The block unit modulation and block repeat modulation module further includes a block unit modulation module and a block repeat modulation module; the block unit modulation module with an input connected with an output of the DFT module is configured for modulating a data symbol block transformed to the frequency domain to generate a block unit; and the block repeat modulation module, an input of which is connected with an output of the block unit modulation module and an output of which is connected with an input of the IFFT module is configured for weighting and repeating the generated block unit and mapping block units obtained by the weighting and repeating onto specified time and frequency locations.

Alternatively, the block unit modulation and block repeat modulation module further includes a block repeat modulation module and a block unit modulation module; the block repeat modulation module with an input connected with an output of the DFT module is configured for weighting and repeating a data symbol block transformed to the frequency domain; and the block unit modulation module, an input of which is connected with an output of the block repeat modulation module and an output of which is connected with an input of the IFFT module is configured for modulating data symbol blocks obtained by the weighting and repeating to generate block units and mapping the block units onto specified time and frequency locations.

Further, an embodiment of the invention provides a system for transmitting information in broadband wireless communications, which includes a transmitter and a receiver connected over a modulation channel, where the transmitter further includes a data modulation module, a serial-parallel conversion module, a DFT module and an IFFT module, and the receiver further includes a Fast Fourier Transform (FFT) module, an Inverse Discrete Fourier Transform (IDFT) module, a parallel-serial conversion module and a data demodulation module, where a block unit modulation and block repeat modulation module configured for block repeat modulation and block unit modulation is further arranged between the DFT module and the IFFT module of the transmitter; and correspondingly, a block unit demodulation and block repeat demodulation module configured for block repeat demodulation and block unit demodulation is further arranged between the FFT module and the IDFT module of the receiver.

Further, an embodiment of the invention provides a method for transmitting information in broadband wireless communications, which includes a transmission flow and a reception flow.

The transmission flow includes:

a1. modulating, segmenting and serial-parallel converting signal data for transmission, and transforming the serial-parallel converted data to frequency domain in a DFT process;

b1. block unit modulating and block repeat modulating a data symbol block transformed to the frequency domain, and mapping block units obtained by the block unit modulating and the block repeat modulating onto specified time and frequency locations; and c1. transforming the block units mapped onto the time and frequency locations in an IFFT process, and appending CPs onto the transformed block units to generate a random sequence in time domain for transmission.

The reception flow includes:

a2. removing CPs from a signal received in the time domain, and transforming the signal without CPs in an FFT process;

b2. block repeat demodulating and block unit demodulating repeat block units on specified time and frequency locations to generate a data symbol block for demodulation; and c2. demodulating the generated data symbol block to generate data for reception.

The method and device for generating a signal and the method and device for transmitting information in broadband wireless communications according to embodiments of the invention can enable effective, reliable and rate-variable transmission of information over a wireless communication channel and also a multiple access to a wireless communication channel resource and can be applicable to a wireless mobile cellular system to facilitate networking at the same frequency and improve a capacity and performance of a system. Since a block repeat as adopted here is in unit of an elementary physical resource block, coordination between cells can be simplified so that static or semi-static coordination is sufficient. Therefore, embodiments of the invention can well address the issues of allocation and scheduling of resources and coordinated control of interference, including control of intra-cell and inter-cell interference, in wireless communications to thereby improve greatly the capacity and performance of the system and provide a broadband wireless communication system with a working solution.

DETAILED DESCRIPTION OF THE EMBODIMENTS

In order to address the drawbacks in the prior art, embodiments of the invention propose block repeat based information transmission, multiplexing and multiple accessing solutions, i.e., a Block Repeat (BR) transmission solution and a Block Repeat Division Multiplex (BRDM)/Block Repeat Division Multiple Access (BRDMA) solution. The solution combined with the OFDM may be referred to as the Block Repeat-Orthogonal Frequency Division Multiplexing (BR-OFDM)/Block Repeat-Orthogonal Frequency Division Multiple Access (BR-OFDMA). Since the block repeat division multiple access is implemented by repeating an elementary physical resource block without limiting a lower layer modulation multiple access, it can be combined with the OFDM multiple access or a plurality of multiple access approaches, e.g., the FDMA, the TDMA, the CDMA, etc., to constitute a variety of solutions.

Figure 1:
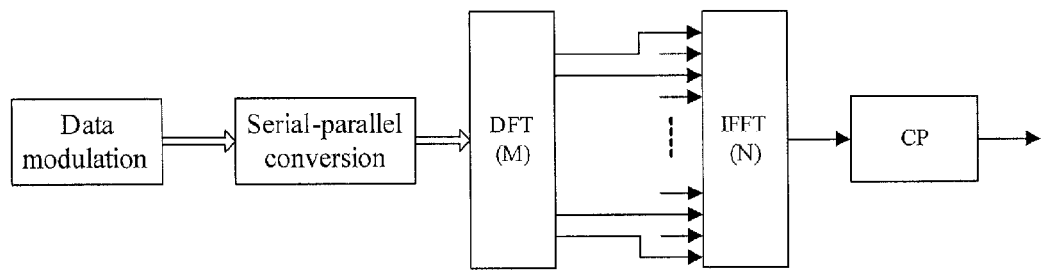
FIG. 1 is a schematic diagram of a flow of generating a signal over the DFT-S OFDM in the prior art.
Figure 2:
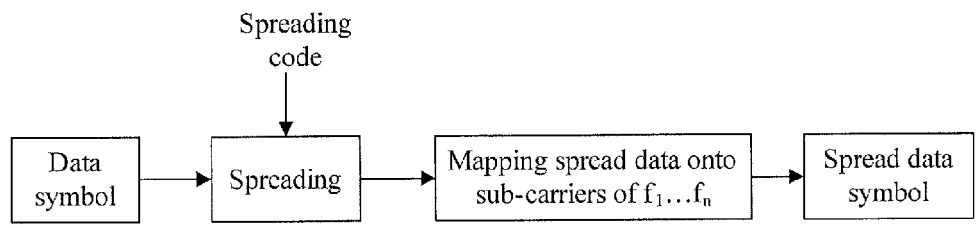
FIG. 2 is a schematic diagram of a principal of generating a signal over the MC-CDMA in the prior art.
Figure 3:
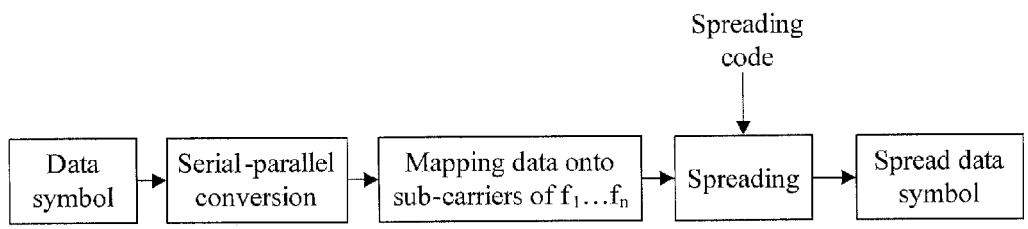
FIG. 3 is a schematic diagram of a principal of generating a signal over the MC-DS-CDMA in the prior art.
Figure 4:
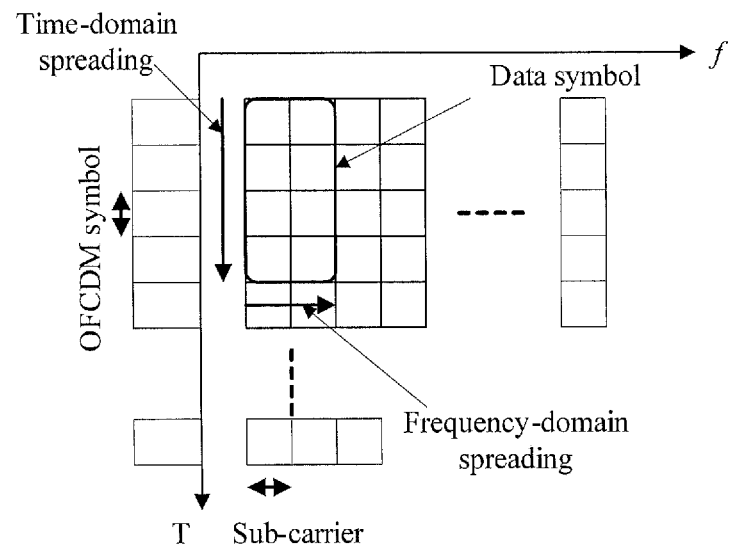
FIG. 4 is a schematic diagram of a principal of generating a signal over the OFCDM with two-dimension spreading in the time and frequency domains in the prior art.
Figure 5:
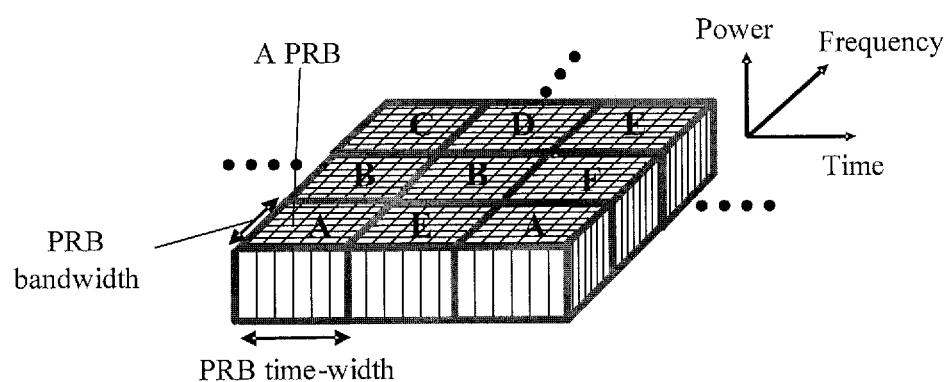
FIG. 5 is a schematic diagram of allocation of channel resources in OFDM modulation according to an embodiment of the invention.

Taking the OFDM as an example, allocation and use of channel resources in OFDM modulation is as illustrated in FIG. 5, where each box is a Physical Resource Block (PRB), which is an elementary unit mapping transport data to the physical layer. A, B, C, D, E and F shown in FIG. 5 represent different users, and as can be apparent, adjacent physical resource blocks may be allocated to the same user or different users, for example, the user B possesses two adjacent physical resource blocks, and the users A and E possess two nonadjacent physical resource blocks respectively.

Figure 6:
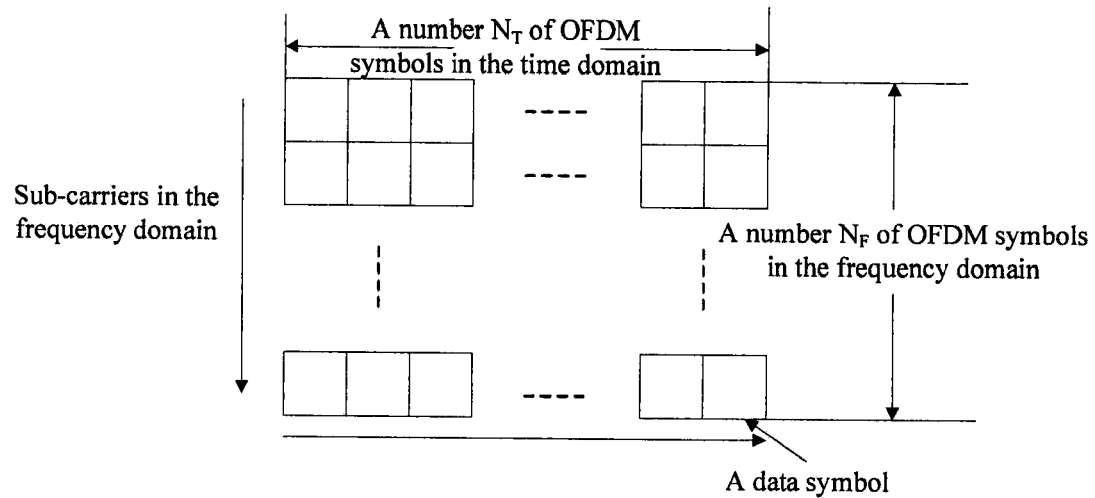
FIG. 6 is a schematic structural diagram of a physical resource block in OFDM modulation according to an embodiment of the invention.

In OFDM modulation, a channel resource is in a two-dimension structure of time and frequency. A specific composition structure of a physical resource block is as illustrated in FIG. 6 showing an OFDM physical resource block which occupies a part of OFDM time and frequency resources and which includes temporally a number $N_T$ of OFDM symbols and a number $N_F$ of OFDM sub-carriers in the frequency domain and thus can provide transmission of a number $N=N_T \times N_F$ of data symbols in each of which a modulated symbol is transmitted. The OFDM time and frequency resources include one or more physical resource blocks. Particularly, $N_T$ and $N_F$ are generally larger than 1, and N is the size of a physical resource block, e.g., $N=9 \times 12$ in the LTE.

Figure 7:
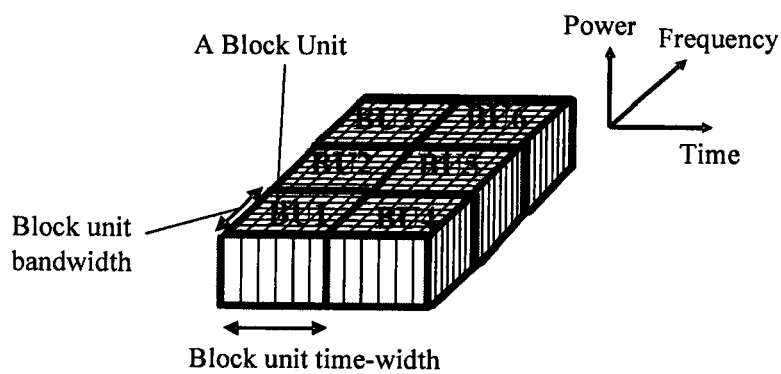
FIG. 7 is a schematic structural diagram of a signal in block repeat transmission according to an embodiment of the invention.
Figure 8:
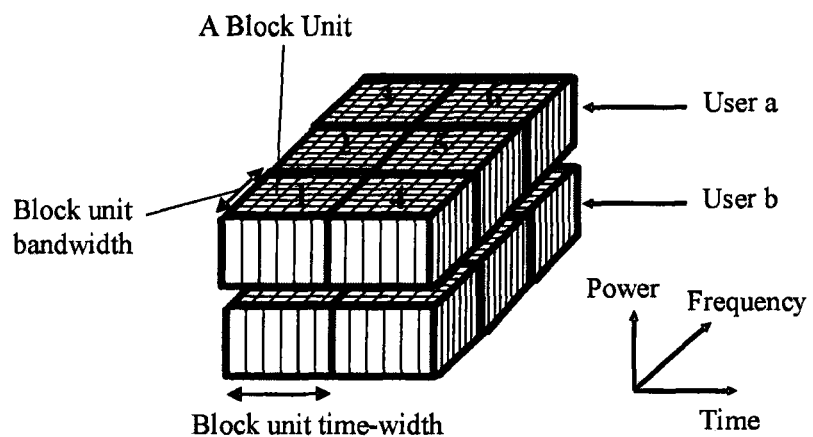
FIG. 8 is a schematic structural diagram of a signal in a block repeat division multiplex access according to an embodiment of the invention.

A physical resource block is regarded as a block unit which is an elementary unit of a block repeat, and correspondingly, the structure of a Block Repeat OFDM (BR-OFDM) signal is as illustrated in FIGS. 7 and 8, where FIG. 7 illustrates a BR-OFDM example of a single user, and FIG. 8 illustrates a BR-OFDM example of plural users. In FIGS. 7 and 8, BU1 to BU6 represent respectively a repeated block of a block unit; the number of times that a block unit repeats may be referred to as a Repeat Factor (RF), and RF=6 in FIGS. 7 and 8. Particularly, a value that the RF takes may be set as required, generally any value ranging from 1 to 8 may be set. The RF taking a too large value may result in increased complexity of calculation. In FIG. 8, two users occupy the same time and frequency channel resource for block repeat transmission, where the user 1 is assumed above and the user 2 is assumed below in the direction of a power axis.

In block repeat transmission, a transmitter gives a block repeat weighting factor sequence (which is referred to as a repeat code), i.e., $C_1 C_2 \ldots C_{RF}$, and each repeat block unit is weighted by a weighting factor for repeat transmission and mapped onto a specified time and frequency location. Here, the weighting factor plays an equivalent role of spreading.

Based upon block repeat transmission illustrated in FIGS. 7 and 8, a block unit and a block repeat shall be modulated respectively in transmission of a signal, and therefore a transmission device for block repeat transmission according to the invention may be embodied in two embodiments, in one of which firstly block unit modulation and then block repeat modulation is performed, and in the other of which firstly block repeat modulation and then block unit modulation is performed.

Figure 9:
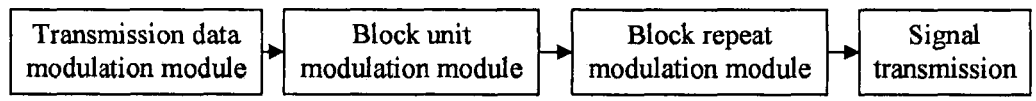
FIG. 9 is a schematic diagram of an embodiment of a transmission system for block repeat transmission according to the invention.

Specifically, a structural block diagram of a transmission device in the first embodiment is as illustrated in FIG. 9, where data for transmission is modulated at three stages into a final signal for transmission, a first of which is transmission data modulation performed at a transmission data modulation module which modulates and segments the data for transmission to generate a Data symbol Block (DB), a second of which is block unit modulation performed at a block unit modulation module which modulates the generated data symbol block to generate a Block Unit (BU), where generation of the block unit is to fill respectively a generated sequence of data symbols (which is referred to as data stream) into time and frequency points corresponding to the block unit, for example, in an interleaving process by an interleaver, and in this embodiment, the data symbol block is put directly into the block unit, and the third of which is block repeat modulation performed at a block repeat modulation module which weights and repeats the block unit and maps block units obtained from the weighting and repeating into specified time and frequency locations to generate the final signal for transmission, where the weighting and repeating is to multiply each of the repeat block units by a repeat code (which is referred to as a repeat factor), i.e., $C_i$, and maps them onto physical resources. Thereafter, the generated signal for transmission is transmitted. Here, the data for transmission is channel-encoded, rate-adapted and combination-mapped data.

Figure 10:
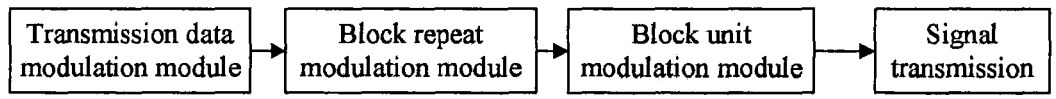
FIG. 10 is a schematic diagram of another embodiment of a transmission system for block repeat transmission according to the invention.

A structural block diagram of a transmission device in the second embodiment is as illustrated in FIG. 10, where data for transmission is modulated at three stages into a final signal for transmission, a first of which is transmission data modulation performed at a transmission data modulation module which modulates and segments the data for transmission to generate a data symbol block, a second of which is block repeat modulation performed at a block repeat modulation module which weights and repeats the data symbol block; and the third of which is block unit modulation performed at a block unit modulation module which maps data symbol blocks obtained by the weighting and repeating into block units at specified time and frequency locations, where mapping is to fill respectively the data symbol blocks sequentially into time and frequency points corresponding to the respective block units in a specific sequence, for example, in an interleaving process by an interleaver, alternatively, the data symbol blocks may be arranged directly into the block units simply.

Figure 11:
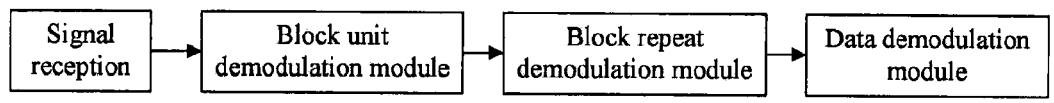
FIG. 11 is a schematic diagram of an embodiment of a reception system for block repeat transmission according to the invention.
Figure 12:
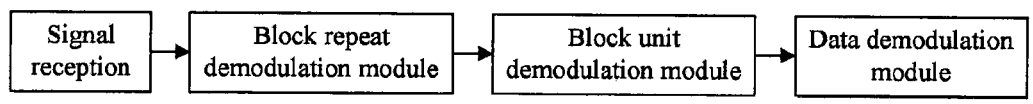
FIG. 12 is a schematic diagram of another embodiment of a reception system for block repeat transmission according to the invention.

The foregoing two embodiments have their own advantages respectively. In the embodiment illustrated in FIG. 9, a block unit is filled by data firstly, and then block repeat modulation is performed in repeat unit of a block unit, to thereby result in strong compatibility with the existing LTE system without any modification to mapping in unit of a block unit but with reduced data correlation. However, in the embodiment illustrated in FIG. 10, firstly data is segmented into blocks and block repeat modulation is performed in unit of a block, and then the block-repeated data is filled into block units, to thereby result in both strong data correlation due to data repeat in a small range and possible use of a less complex detection algorithm but with a modification to original mapping of data. As can be apparent from the foregoing description, the foregoing two embodiments have their own advantages and disadvantages but can be applicable in the invention and selected for a specific application scenario. In correspondence to the block repeat transmission devices in FIGS. 9 and 10, FIGS. 11 and 12 illustrate two corresponding block repeat reception devices respectively, where FIG. 12 illustrates a reception device corresponding to the transmission device in FIG. 9, and FIG. 11 illustrates a reception device corresponding to the transmission device in FIG. 10. As illustrated in FIG. 11, a specific implementation process of a block repeat reception device is as follows: data for reception is demodulated at three stages into a final signal for reception, a first of which is block unit demodulation performed at a block unit demodulation module which detects and inversely maps repeat block units at specified time and frequency locations into data symbol blocks; a second of which is block repeat demodulation performed at a block repeat demodulation module which weights and combines the data symbol blocks generated from the repeat block units to generate a data symbol block for demodulation; and the third of which is data demodulation performed at a data demodulation module which demodulates the generated data symbol block to generate the final data for reception.

As illustrated in FIG. 12, a specific implementation process of another block repeat reception device is as follows: data for reception is demodulated at three stages into a final signal for reception, a first of which is block repeat demodulation performed at a block repeat demodulation module which weights and combines repeat block units at specified time and frequency locations to generate a demodulated block unit; a second of which is block unit demodulation performed at a block unit demodulation module which detects and inversely maps the demodulated block unit into a data symbol block; and the third of which is data demodulation performed at a data demodulation module which demodulates the generated data symbol block into the final data for reception.

In view of similarity of generating a signal over the OFDM to over the DFT-S OFDM, the BR-OFDMA can be applicable in uplink signal transmission of LTE. A block repeat can result in reduced interference of uplink signal transmission of the DFT-S OFDM in the case of networking at the same frequency as well as an improved system capacity and ratio of resource utilization.

An essential idea of embodiments of the invention lies in that combination of a block repeat with the DFT-S OFDM may be referred to as a Block Repeat-Orthogonal Frequency Division Multiple Access (OFDMA). In DFT-S OFDM modulation, channel resources in the frequency domain is also in a two-dimension structure of time and frequency, and a DFT-S OFDM physical resource block unit occupies a part of time and frequency resources. Each physical resource block unit includes temporally a number $N_T$ of long block symbols in the time domain and a number $N_F$ of sub-carriers in the frequency domain and thus can provide transmission of a number $N=N_T \times N_F$ of data symbols.

Figure 13:
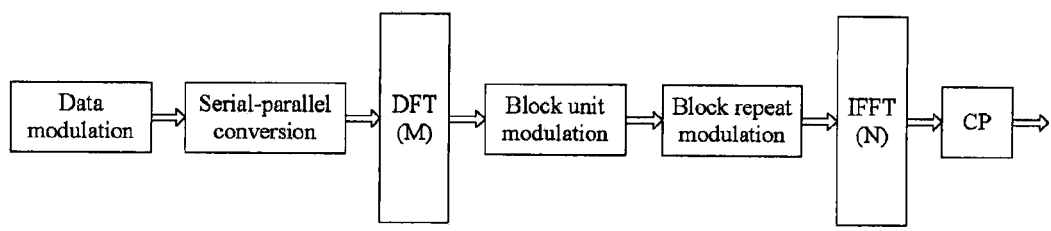
FIG. 13 is a schematic diagram of a flow of generating a signal over a BR DFT-S OFDM according to an embodiment of the invention.
Figure 14:
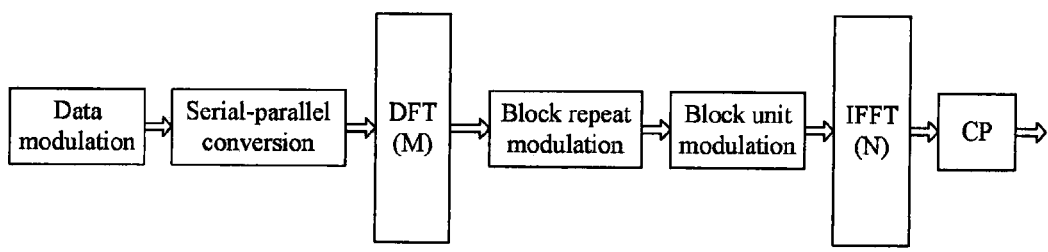
FIG. 14 is a schematic diagram of another flow of generating a signal over the BR DFT-S OFDM according to an embodiment of the invention.

In an embodiment of the invention, generation of a signal over the BR DFT-S OFDM may be as illustrated in FIG. 13 or 14, where block unit modulation and block repeat modulation is added between DFT and IFFT processes, that is, a data symbol block transformed to the frequency domain in the DFT process is firstly subject to modulation and weighting and repeating, then subject to IFFT, and finally is appended with CPs to generate a random sequence in the time domain. Here, the modulation, and weighting and repeating may include firstly weighting and repeating a data symbol block and then modulating the data symbol blocks obtained from the weighting and repeating into block units, and mapping the block units onto to specified time and frequency locations. Alternatively, the data symbol block may firstly be modulated to generate a block unit which is then weighted and repeated and then the block units obtained from the weighting and repeating are mapped onto specified time and frequency locations.

Specifically, as illustrated in FIG. 13, generation of a signal over the BR DFT-S OFDM according to an embodiment of the invention includes the following operations 131-136.

Operation 131: signal data for transmission is modulated and a data stream for transmission is segmented, and then the segmented data stream is serial-parallel converted;

Operation 132: the serial-parallel converted data is transformed to the frequency domain in a DFT process;

Operation 133: a data symbol block transformed to the frequency domain is modulated to generate a block unit;

Operation 134: the generated block unit is weighted and repeated, and block units obtained from the weighting and repeating are mapped onto specified time and frequency locations; and Operations 135 to 136: the block units mapped onto the time and frequency locations are subject to an IFFT process and appended with CPs to generate a random sequence in the time domain.

As illustrated in FIG. 14, alternative generation of a signal over the BR DFT-S OFDM according to an embodiment the invention includes the following operations 141-146:

Operation 141: signal data for transmission is modulated and a data stream for transmission is segmented, and then the segmented data stream is serial-parallel converted;

Operation 142: the serial-parallel converted data is transformed to the frequency domain in a DFT process;

Operation 143: a data symbol block transformed to the frequency domain is weighted and repeated;

Operation 144: the data symbol blocks obtained from the weighting and repeating are modulated to generate block units which are mapped onto specified time and frequency locations; and Operations 145 to 146: the block units mapped onto the time and frequency locations are subject to an IFFT process and appended with CPs to generate a random sequence in the time domain.

In generation of a signal illustrated in FIG. 13 or 14, corresponding functions may be performed in corresponding modules, for example, data modulation is performed in a data modulation module, serial-parallel conversion is performed in a serial-parallel conversion module, the DFT process is performed in a DFT module, block unit modulation is performed in a block unit modulation module, block repeat modulation is performed in a block repeat modulation module, the IFFT process is performed in an IFFT module, and addition of the CPs is performed in a CP module, where the block unit modulation module and the block repeat modulation module may be integrated in a module referred to as a block unit modulation and block repeat modulation module configured to perform block repeat modulation and block unit modulation.

Figure 15:
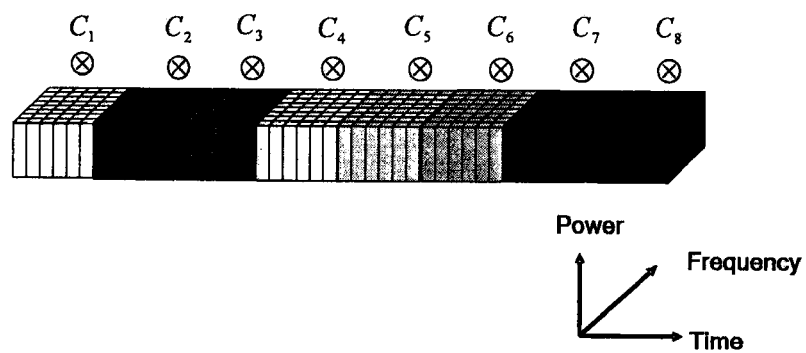
FIG. 15 is a schematic diagram of a block repeat in the time domain for a single user according to an embodiment of the invention.

In BR DFT-S OFDM modulation, only a block repeat in the time domain is adopted to preserve the single-carrier characteristic of the DFT-S OFDM, because coverage performance of an uplink signal may be compromised if the signal is transmitted in the form of a multiple carrier. Taking FIG. 13 as an example, the DFT processed data symbol block is firstly modulated to generate a block unit BU1, and given a repeat factor of 8, the BU1 is repeated for eight times into BU1, BU2, . . . , BU8 respectively, the generated repeat blocks are multiplied by a sequence of block repeat weighting factors of $C_1 C_2 \ldots C_8$, and the resultant weighted repeat blocks are mapped sequentially in time onto corresponding physical sub-carriers, and the different weighted repeat blocks are transmitted in time division as illustrated in FIG. 15 where the BU1, BU2, . . . , BU8 sequentially from the left to the right correspond to the weighting factors $C_1, C_2, \ldots, C_8$ respectively.

Figure 16:
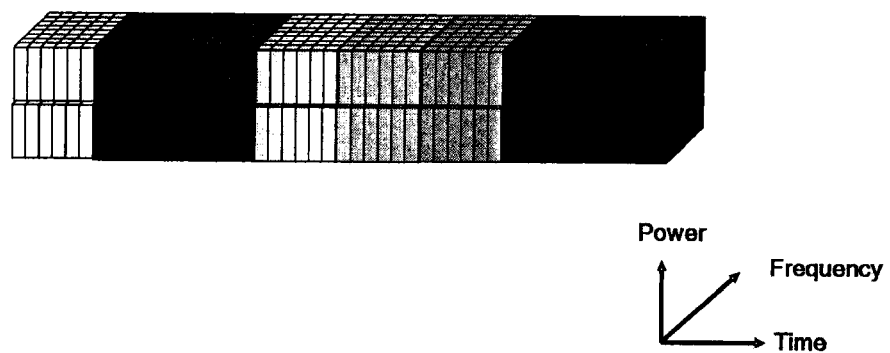
FIG. 16 is a schematic diagram of a block repeat in the time domain for two users according to an embodiment of the invention.

FIG. 16 illustrates a schematic diagram of block repeat transmission in the time domain for two users distinguished by different block repeat weighting sequences.

Figure 17:
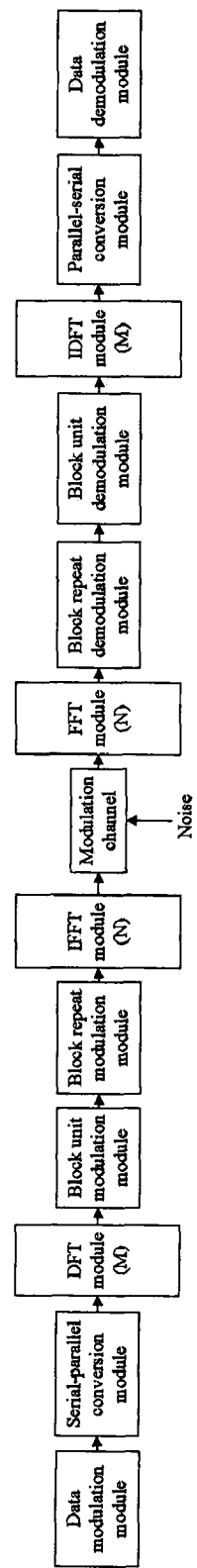
FIG. 17 is a schematic structural diagram of a communication system for BR DFT-S OFDM transmission according to an embodiment of the invention.

Further to the foregoing generation of a signal, FIG. 17 illustrates a structure of embodying a BR DFT-S OFDM communication system, which includes two parts of a transmitter and a receiver connected over a modulation channel, where the transmitter includes a data modulation module, a serial-parallel conversion module, a DFT module, a block unit modulation module, a block repeat modulation module and an IFFT module, and the receiver includes a Fast Fourier Transformation (FFT) module, a block repeat demodulation module, a block unit demodulation module, an Inverse Discrete Fourier Transformation (IDFT) module, a parallel-serial conversion module and a data demodulation module.

Here, the data modulation module is configured for data modulating, the serial-parallel conversion module is configured for serial-parallel converting, the DFT module is configured for transforming in a DFT process, the block unit modulation module is configured for block unit modulating, i.e., modulating a data symbol block transformed to the frequency domain to generate a block unit, the block repeat modulation module is configured for block repeat modulating, i.e., weighting and repeating the generated block unit and mapping the block units obtained from the weighting and repeating onto specified time and frequency locations, and the IFFT module is configured for transforming in an IFFT process; and correspondingly, the FFT module is configured for transforming in an FFT process, the block repeat demodulation module is configured for block repeat demodulating, i.e., weighting and combining the repeat block units on the specified time and frequency locations to generate a demodulated block unit, the block unit demodulation module is configured for block unit demodulating, i.e., detecting and inversely mapping the demodulated block unit into a data symbol block, the IDFT module is configured for transforming in an IDFT process, and the data demodulation module is configured for demodulating data.

In a practical application, the block unit modulation module and the block repeat modulation module may be integrated in a module referred to as a block unit modulation and block repeat modulation module configured for block repeat modulation and block unit modulation; and correspondingly, the block unit demodulation module and the block repeat demodulation module may be integrated in a module referred to as a block unit demodulation and block repeat demodulation module configured for block repeat demodulation and block unit demodulation A method for transmitting information based upon FIG. 17 includes a transmission flow and a reception flow, where the transmission flow includes:

a1: signal data for transmission is modulated, segmented and serial-parallel converted, and then the serial-parallel converted data is transformed to the frequency domain in a DFT process;

b1: a data symbol block transformed to the frequency domain is subject to block unit modulation and block repeat modulation, and block units obtained by the block unit modulation and block repeat modulation are mapped onto specified time and frequency locations; and c1: the block units mapped onto the time and frequency locations are subject to an IFFT process and appended with CPs to generate a random sequence in the time domain for transmission.

The reception flow includes:

a2. CPs are removed from a signal received in the time domain, and an FFT process is performed on the signal without the CPs;

b2. repeat block units on the specified time and frequency locations are subject to block repeat demodulation and block unit demodulation to generate a data symbol block for demodulation; and c2. the generated data symbol block is demodulated to generate data for reception.

Figure 18:
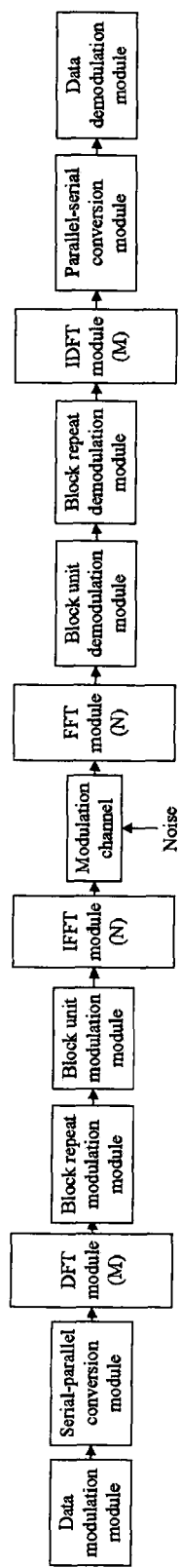
FIG. 18 is a schematic structural diagram of another communication system for BR DFT-S OFDM transmission according to an embodiment of the invention.

FIG. 18 illustrates another structure of embodying a BR DFT-S OFDM communication system with substantially the same implementation principal, flow and system composition as in FIG. 17 except for the exchanged block unit modulation/demodulation module and block repeat modulation/demodulation module and also the exchanged block unit modulation/demodulation process and block repeat modulation/demodulation process.

The method and device for generating a signal and method and device for transmitting information according to embodiments of the invention can enable effective, reliable and rate-variable transmission of information over a wireless communication channel and also a multiple access to a wireless communication channel resource and can be applicable to a wireless mobile cellular system to facilitate networking at the same frequency and improve a capacity and performance of a system. Since a block repeat as adopted here is in unit of an elementary physical resource block, coordination between cells can be simplified so that static or semi-static coordination is sufficient. Therefore, the invention can well address the issues of allocation and scheduling of resources and coordinated control of interference, including control of intra-cell and inter-cell interferences, in wireless communications to thereby improve greatly the capacity and performance of the system and provide a broadband wireless communication system with a working solution.

The foregoing descriptions are merely illustrative of the preferred embodiments of the invention but not intended to limit the scope of the invention.

The invention claimed is:

1. A method for generating a signal in broadband wireless communications, comprising:

modulating, segmenting and serial-parallel converting signal data for transmission, and transforming the serial-parallel converted data to frequency domain in a Discrete Fourier Transformation, DFT, process;

block unit modulating and block repeat modulating a data symbol block transformed to the frequency domain, and mapping block units obtained by the block unit modulating and block repeat modulating onto specified time and frequency locations; and transforming the block units mapped onto the time and frequency locations in an Inverse Fast Fourier Transformation, IFFT, process, and appending Cyclic Prefixes, CPs, to the transformed block units to generate a random sequence in time domain, wherein the block unit modulating and block repeat modulating step comprises one of:

a) modulating, by a block unit modulation module, the data symbol block transformed to the frequency domain to generate a block unit, wherein an input of the block unit modulation module is connected with an output of a DFT module; and weighting and repeating the generated block unit, by a block repeat modulation module, wherein the block units obtained by the block unit modulating and block repeat modulating are block units obtained from the weighting and repeating, wherein an input of the block repeat module is connected with an output of the block unit modulation module and an output of the block repeat modulation module is connected with an input of an IFFT module, and b) weighing and repeating, by a block repeat modulation module, the data symbol block transformed to the frequency domain, wherein an input of the block repeat module is connected with an output of a DFT module; and modulating, by a block unit modulation module, data symbol blocks obtained from the weighting and repeating to generate block units, wherein the block units obtained by the block unit modulating and block repeat modulating are block units generated from the modulating of the data symbol blocks, wherein an input of the block unit modulation module is connected with an output of the block repeat modulation module and an output of the block unit modulation module is connected with an input of an IFFT module.

2. The method of claim 1, wherein, the weighting and repeating is performed in the time domain.

3. The method claim 1, wherein, different users are multiplexed along a power axis and distinguished by different block repeat weighting sequences.

4. A device for generating a signal in broadband wireless communications, comprising a data modulation module, a serial-parallel conversion module, a Discrete Fourier Transformation (DFT) module, an Inverse Fast Fourier Transformation (IFFT) module, a Cyclic Prefix module, and a block unit modulation and block repeat modulation module which is arranged between the DFT module and the IFFT module and configured for block repeat modulation and block unit modulation, wherein, the block unit modulation and block repeat modulation module further comprises a block unit modulation module and a block repeat modulation module;

the block unit modulation module, an input of which is connected with an output of the DFT module is configured for modulating a data symbol block transformed to frequency domain to generate a block unit; and the block repeat modulation module, an input of which is connected with an output of the block unit modulation module and an output of which is connected with an input of the IFFT module, is configured for weighting and repeating the generated block unit and mapping block units obtained from the weighting and repeating onto specified time and frequency locations; or wherein, the block unit modulation and block repeat modulation module further comprises a block repeat modulation module and a block unit modulation module;

the block repeat modulation module, an input of which is connected with an output of the DFT module, is configured for weighting and repeating a data symbol block transformed to the frequency domain; and the block unit modulation module, an input of which is connected with an output of the block repeat modulation module and an output of which is connected with an input of the IFFT module, is configured for modulating data symbol blocks obtained from the weighting and repeating to generate block units and mapping the generated block units onto specified time and frequency locations.

5. The device of claim 4, wherein, the weighting and repeating is performed in time domain.

6. The device claim 4, wherein, different users are multiplexed along a power axis and distinguished by different block repeat weighting sequences.

7. A system for transmitting information in broadband wireless communications, comprising:

a transmitter and a receiver connected over a modulation channel, wherein, the transmitter further comprises a data modulation module, a serial-parallel conversion module, a DFT module and an IFFT module, and the receiver further comprises a Fast Fourier Transformation (FFT) module, an Inverse Discrete Fourier Transformation (IDFT) module, a parallel-serial conversion module and a data demodulation module, wherein, a block unit modulation and block repeat modulation module is further arranged between the DFT module and the IFFT module of the transmitter and configured for modulating a data symbol block transformed to frequency domain to generate a block unit, weighting and repeating the generated block unit and mapping block units obtained from the weighting and repeating onto specified time and frequency locations, or configured for weighing and repeating a data symbol block transformed to frequency domain, modulating data symbol blocks obtained from the weighting and repeating to generate block units and mapping the generated block units onto specified time and frequency locations; and correspondingly, a block unit demodulation and block repeat demodulation module is further arranged between the FFT module and the IDFT module of the receiver and configured for weighting and combining repeat block units on specified time and frequency locations to generate a demodulated block unit, and detecting and inversely mapping the demodulated block unit into a data symbol block, or configured for detecting and inversely mapping repeat block units on specified time and frequency locations into data symbol blocks, and weighting and combining the data symbol blocks generated from the repeat block units to generate a data symbol block for demodulation, (A) wherein, the block unit modulation and block repeat modulation module further comprises a block unit modulation module and a block repeat modulation module; the block unit modulation module, an input of which is connected with an output of the DFT module, is configured for modulating a data symbol block transformed to the frequency domain to generate a block unit; and the block repeat modulation module, an input of which is connected with an output of the block unit modulation module and an output of which is connected with an input of the IFFT module, is configured for weighting and repeating the generated block unit and mapping block units obtained from the weighting and repeating onto specified time and frequency locations; the block unit demodulation and block repeat demodulation module further comprises a block repeat demodulation module and a block unit demodulation module; the block repeat demodulation module, an input of which is connected with an output of the FFT module, is configured for weighting and combining repeat block units on specified time and frequency locations to generate a demodulated block unit; and the block unit demodulation module, an input of which is connected with an output of the block repeat demodulation module and an output of which is connected with an input of the IDFT module, is configured for detecting and inversely mapping the demodulated block unit into a data symbol block;

or (B) wherein, the block unit modulation and block repeat modulation module further comprises a block repeat modulation module and a block unit modulation module; the block repeat modulation module, an input of which is connected with an output of the DFT module, is configured for weighting and repeating a data symbol block transformed to the frequency domain; and the block unit modulation module, an input of which is connected with an output of the block repeat modulation module and an output of which is connected with an input of the IFFT module, is configured for modulating data symbol blocks obtained from the weighting and repeating to generate block units and mapping the generated block units onto specified time and frequency locations; the block unit demodulation and block repeat demodulation module further comprises a block unit demodulation module and a block repeat demodulation module; the block unit demodulation module, an input of which is connected with an output of the FFT module, is configured for detecting and inversely mapping repeat block units on specified time and frequency locations into data symbol blocks; and the block repeat demodulation module, an input of which is connected with an output of the block unit demodulation module and an output of which is connected with an input of the IDFT module, is configured for weighting and combining the data symbol blocks generated from the repeat block units to generate a data symbol block for demodulation.

8. A method for transmitting information in broadband wireless communications, comprising a transmission flow and a reception flow, wherein:

the transmission flow comprises:

modulating, segmenting and serial-parallel converting signal data for transmission, and transforming the serial-parallel converted data to frequency domain in a DFT process;

block unit modulating and block repeat modulating a data symbol block transformed to the frequency domain, and mapping block units obtained by the block unit modulating and block repeat modulating onto specified time and frequency locations, wherein the block unit modulating and block repeat modulating is performed by a block unit modulation module and a block repeat modulation module; and transforming the block units mapped onto the time and frequency locations in an IFFT process, and appending Cyclic Prefixes (CPs) on the transformed block units to generate a random sequence in time domain for transmission; and the reception flow comprises:

removing the CPs from a signal received in the time domain, and transforming the signal without the CPs in an FFT process;

block repeat demodulating and block unit demodulating repeat block units on the specified time and frequency locations to generate a data symbol block for demodulation, wherein the block repeat demodulating and block unit demodulating is performed by a block repeat demodulation module and a block unit demodulation module; and demodulating the generated data symbol block to generate data for reception, wherein the block unit modulating and block repeat modulating step further comprises one of:

a) modulating a data symbol block transformed to the frequency domain to generate a block unit, by the block unit modulation module, wherein an input of the block unit modulation module is connected with an output of a DFT module; weighting and repeating the generated block unit and mapping block units obtained from the weighting and repeating onto specified time and frequency locations, by the block repeat modulation module, wherein an input of the block repeat modulation module is connected with an output of the block unit modulation module and an output of the block repeat modulation module is connected with an input of an IFFT module; weighting and combining repeat block units on specified time and frequency locations to generate a demodulated block unit, by the block repeat demodulation module, wherein an input of the block repeat demodulation module is connected with an output of an FFT module; and detecting and inversely mapping the demodulated block unit into a data symbol block, by the block unit demodulation module, wherein an input of the block unit demodulation module is connected with an output of the block repeat demodulation module and an output of the block unit demodulation module is connected with an input of an IDFT module, and b) weighting and repeating a data symbol block transformed to the frequency domain, by the block repeat modulation module, wherein an input of the block repeat modulation module is connected with an output of a DFT module; modulating data symbol blocks obtained from the weighting and repeating to generate block units and mapping the generated block units onto specified time and frequency locations, by the block unit modulation module, wherein an input of the block unit modulation module is connected with an output of the block repeat modulation module and an output of the block unit modulation module is connected with an input of an IFFT module; detecting and inversely mapping repeat block units on specified time and frequency locations into data symbol blocks, by the block unit demodulation module, wherein an input of the block unit demodulation module is connected with an output of an FFT module; and weighting and combining the data symbol blocks generated from the repeat block units to generate a data symbol block for demodulation, by the block repeat demodulation module, wherein an input of the block repeat demodulation module is connected with an output of the block unit demodulation module and an output of the block repeat demodulation module is connected with an input of an IDFT module.

* * * * *